United States Patent
Kim et al.

(10) Patent No.: US 7,126,575 B2
(45) Date of Patent: Oct. 24, 2006

(54) LAMP DRIVING APPARATUS, BACKLIGHT ASSEMBLY AND LIQUID CRYSTAL DISPLAY DEVICE USING THE SAME

(75) Inventors: Dong-Hoon Kim, Suwon-si (KR); Jong-Dae Park, Seoul (KR); Jae-Ho Jung, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 370 days.

(21) Appl. No.: 10/629,056

(22) Filed: Jul. 28, 2003

(65) Prior Publication Data
US 2004/0174332 A1    Sep. 9, 2004

(30) Foreign Application Priority Data
Mar. 3, 2003    (KR) .................. 10-2003-0013178

(51) Int. Cl.
*G09G 3/36*    (2006.01)

(52) U.S. Cl. .................. 345/102; 345/87; 345/95; 345/104

(58) Field of Classification Search .......... 345/87–104, 345/204–215
See application file for complete search history.

(56) References Cited

U.S. PATENT DOCUMENTS

| | | | | |
|---|---|---|---|---|
| 5,739,803 A * | 4/1998 | Neugebauer | .................. | 345/98 |
| 6,297,791 B1 * | 10/2001 | Naito et al. | .................... | 345/89 |
| 2004/0174332 A1 * | 9/2004 | Kim et al. | .................. | 345/102 |
| 2004/0174333 A1 * | 9/2004 | Kim et al. | .................. | 345/102 |
| 2005/0093463 A1 * | 5/2005 | Jang et al. | .................. | 315/160 |

* cited by examiner

*Primary Examiner*—Vijay Shankar
(74) *Attorney, Agent, or Firm*—Cantor Colburn LLP

(57) ABSTRACT

In a lamp driving apparatus, backlight assembly and liquid crystal display device using the same, the lamp driving module is mounted on the substrate and provides lamps with power voltage. Sensors are disposed on the substrate to face the lamps, and detect operation state of the lamps to output sensing signals. Voltage cut-off module is disposed on the substrate and compares the sensing signals with a predetermined reference signal. The voltage cut-off module provides the lamp driving module with voltage cut-off signal when at least one of the sensing signals has an amplitude smaller than the reference signal. The deterioration of the lamps may be prevented, and the life expectancy of lamps except broken lamps may be increased.

22 Claims, 11 Drawing Sheets

LAMP DRIVING APPARATUS, BACKLIGHT ASSEMBLY AND LIQUID CRYSTAL DISPLAY DEVICE USING THE SAME

CROSS-REFERENCE TO RELATED APPLICATIONS

This application relies for priority upon Korean Patent Application No.2003-13178 filed on Mar. 3, 2003, the contents of which are herein incorporated by reference in its entirety.

BACKGROUND OF THE INVENTION

1. Field of the Invention

The present invention relates to lamp a driving apparatus, a backlight assembly and a liquid crystal display device using the same.

2. Description of the Related Art

A liquid crystal display (LCD) device is a flat panel display device and display an image by means of liquid crystal. The liquid crystal changes a transmissivity of light passing through the liquid crystal according to an electric field applied to the liquid crystal.

However, since the liquid crystal is not able to generate light, the liquid crystal display device employs lamps so as to display images under dark environment. The liquid crystal display device having a small screen size employs one or two lamps so as to display images.

According as the screen size of the liquid crystal display device increases, the liquid crystal display device employs a plurality of lamps, for example 10~20 lamps. In addition, some liquid crystal display device employs lamps arrange in parallel.

However, when the liquid crystal display device employs a plurality of lamps, the cost for manufacturing the liquid crystal display device, the weight and size of the liquid crystal display device greatly increases since the number of lamp driving apparatus also increase according to the increase of the number of the lamps.

In order to reduce the number of the lamp driving apparatus, the liquid crystal display device employs the lamps, each of which is parallel connected, arranged in parallel and one or two lamp driving apparatus for turning on or turning off the lamps simultaneously.

The conventional liquid crystal display device may reduce the number of the lamp driving apparatus, but the life expectancy of the other lamps except broken lamps may be reduced and the other lamps may be damaged because over current may be flow through the other lamps when one of the lamps are broken down.

SUMMARY OF THE INVENTION

Accordingly, it is one aspect of the present invention to provide a lamp driving apparatus, which provides parallel connected lamps with power voltage, detects abnormal operation of the lamps, and prevents the power voltage from being supplied to the lamps so as to protects the lamps when at least one of the lamps operates abnormally.

It is another aspect of the present invention to provide a backlight assembly employing above lamp driving apparatus.

It is further another aspect of the present invention to provide a liquid crystal display device having above backlight assembly.

In one aspect of the present invention, there is provided a lamp driving apparatus. The lamp driving apparatus includes a plurality of lamps arranged in parallel, a substrate facing the lamps, a lamp driving module, a plurality of sensors and a voltage cut-off module. The lamp driving module is mounted on the substrate and provides the lamps with a power voltage. The sensors are disposed on the substrate to face the lamps, and detect an operation state of the lamps to output a plurality of sensing signals. The voltage cut-off module is disposed on the substrate, and compares the sensing signals with a predetermined reference signal. The voltage cut-off module provides the lamp driving module with a voltage cut-off signal to prevent the lamp driving module from providing the lamps with the power voltage when at least one of the sensing signals has an amplitude smaller than the reference signal.

In another aspect of the present invention, there is provided a backlight assembly comprising a lamp assembly, a receiving container and a lamp driving device. The lamp assembly includes a plurality of lamps arranged in parallel, each of the lamps has a first electrode formed at a first end and a second electrode formed at a second end, and the lamp assembly provides the lamps with a power voltage to turn on or turn off the lamps. The receiving container receives the lamp assembly, and has a plurality of openings facing each of the lamps. The lamp driving device includes i) a substrate facing the receiving container, ii) a lamp driving module, mounted on the substrate, for providing the lamps with the power voltage, iii) a plurality of sensors, disposed on the substrate to face the lamps, for detecting an operation state of the lamps to output a plurality of sensing signals, iv) a voltage cut-off module, disposed on the substrate, for comparing the sensing signals with a predetermined reference signal. The voltage cut-off module provides the lamp driving module with a voltage cut-off signal to prevent the lamp driving module from providing the lamps with the power voltage when at least one of the sensing signals has an amplitude smaller than the reference signal.

In further another aspect of the present invention, there is provided a liquid crystal display device comprising a backlight assembly and a liquid crystal display panel assembly. The backlight assembly includes i) a lamp assembly including a plurality of lamps arranged in parallel, each of the lamps having a first electrode formed at a first end and a second electrode formed at a second end, the lamp assembly providing the lamps with a power voltage to turn on or turn off the lamps, ii) a receiving container for receiving the lamp assembly, the receiving container having a plurality of openings facing each of the lamps, iii) a lamp driving device including iii-1) a substrate facing the receiving container, iii-2) a lamp driving module, mounted on the substrate, for providing the lamps with the power voltage, iii-3) a plurality of sensors, disposed on the substrate to face the lamps, for detecting an operation state of the lamps to output a plurality of sensing signals, iii-4) a voltage cut-off module, disposed on the substrate, for comparing the sensing signals with a predetermined reference signal, the voltage cut-off module providing the lamp driving module with a voltage cut-off signal to prevent the lamp driving module from providing the lamps with the power voltage when at least one of the sensing signals has an amplitude smaller than the reference signal. The liquid crystal display panel assembly is mounted on the receiving container, and displays an image using a light generating from the lamps.

As described above, according to the liquid crystal display device of this invention, the sensors for detecting the operation state of the lamps are installed in the lamp driving apparatus. The lamp driving apparatus may detect the abnormal operation of the lamps.

Therefore, the cost for manufacturing the liquid crystal display device may be reduced, and the life expectancy of the other lamps except broken lamps may be increased.

BRIEF DESCRIPTION OF THE DRAWINGS

The above and other features and advantages of the present invention will become more apparent by describing in detail the preferred embodiments thereof with reference to the accompanying drawings, in which.

DESCRIPTION OF PREFERRED EMBODIMENTS

Hereinafter preferred embodiment of the present invention will be described in detail with reference to the accompanying drawings.

<Embodiment 1 of Lamp Driving Apparatus>

Figure 1:
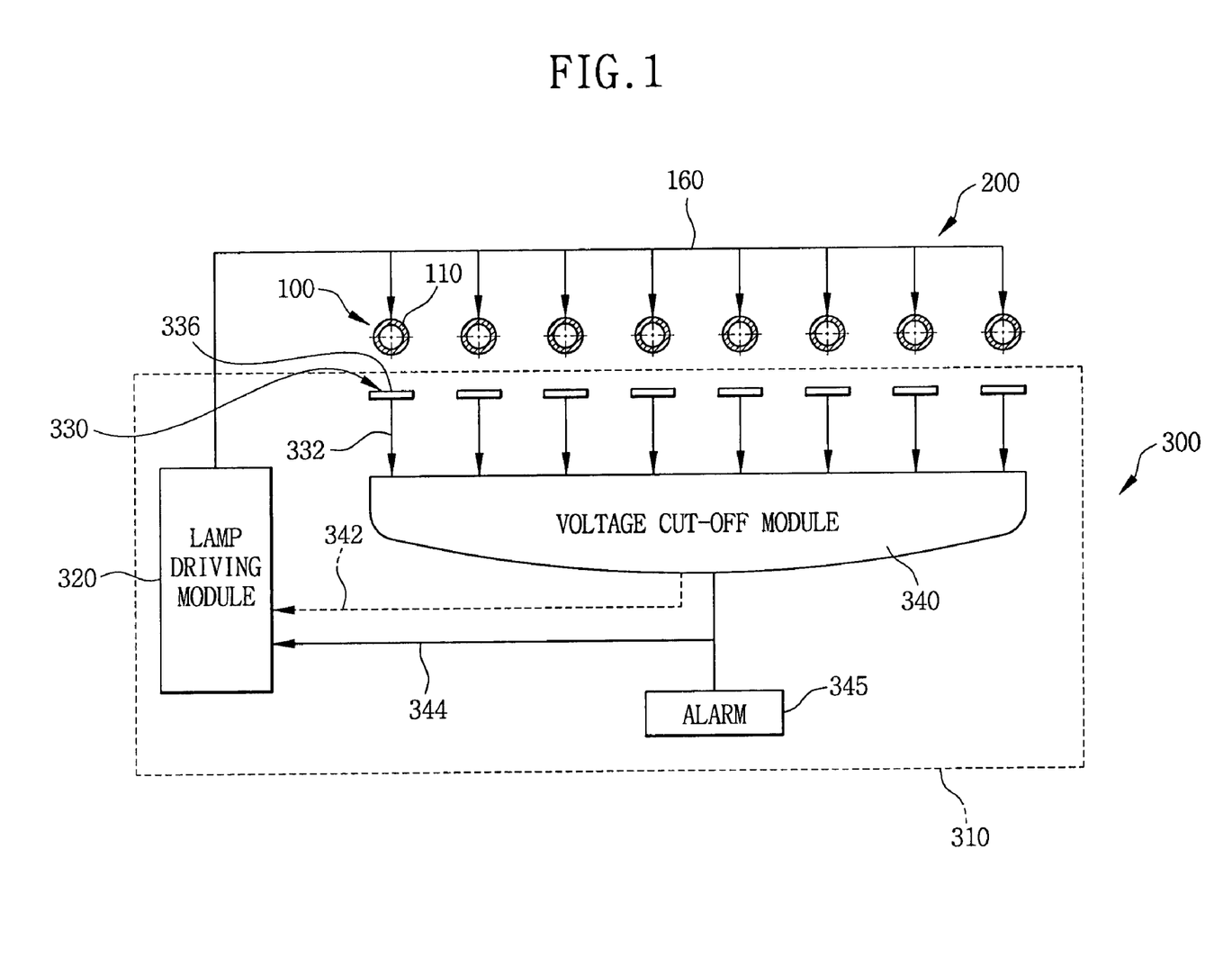
FIG. 1 is a schematic view showing a lamp driving apparatus according to a first exemplary embodiment of the present invention.
Figure 2:
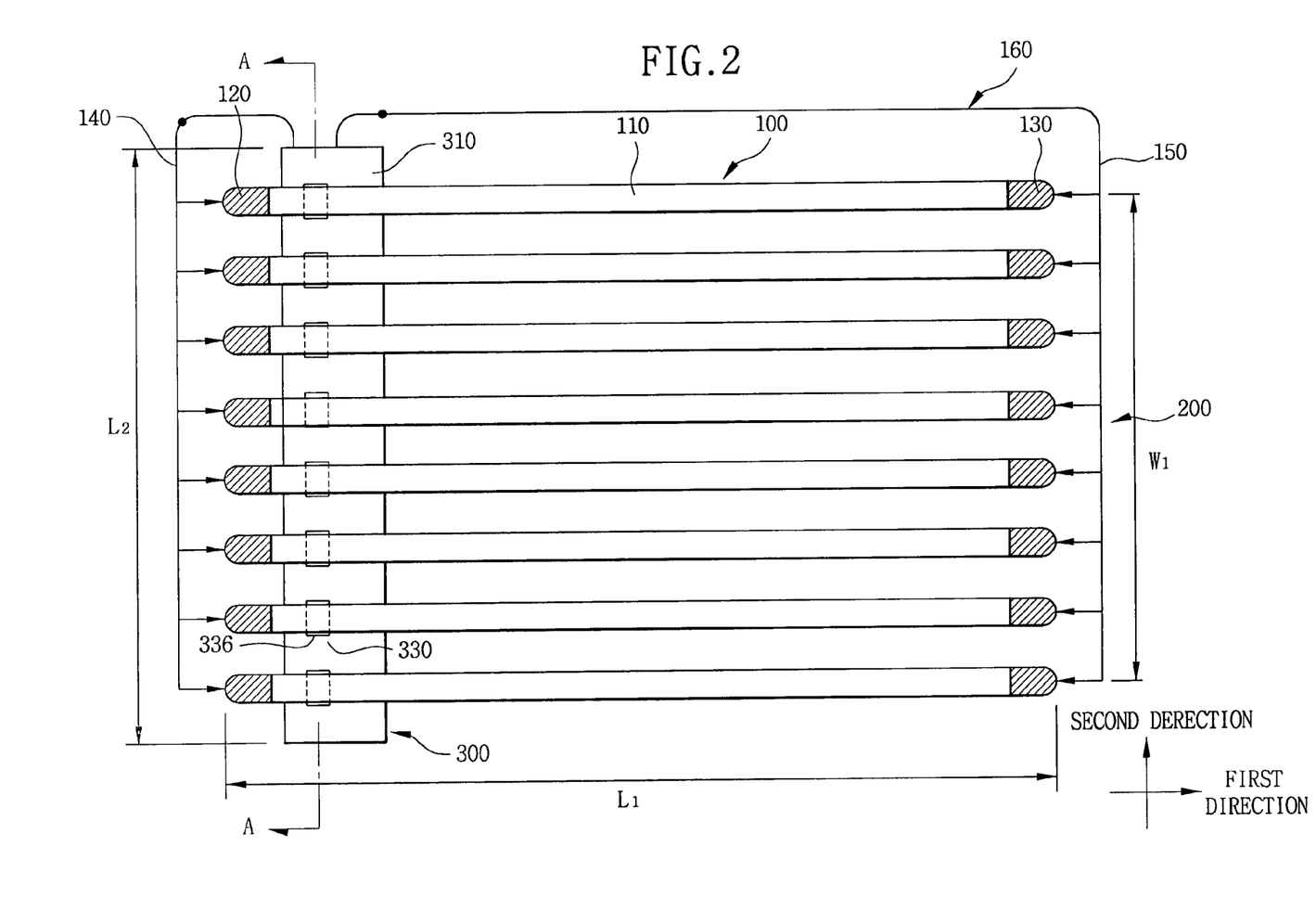
FIG. 2 is a schematic view showing a lamp assembly and the lamp driving apparatus of FIG. 1.

FIG. 1 is a schematic view showing a lamp driving apparatus according to a first exemplary embodiment of the present invention, and FIG. 2 is a schematic view showing a lamp assembly and the lamp driving apparatus of FIG. 1.

Referring to FIG. 1, the lamp assembly 200 includes a plurality of lamps 100 and a module 160. The lamp driving apparatus 300 supplies power voltage to the lamp assembly 200.

Referring to FIG. 2, each of the lamps 100 includes a lamp body 110, a first electrode 120 and a second electrode 130. For example, the lamp may be a cold cathode fluorescent lamp (CCFL). The first electrode 120 is disposed at a first end of the lamp, and the second electrode 130 is disposed at a second end of the lamp.

At least two lamps are arranged in parallel. Each of the lamps has a length L1, and the total width of the lamps 100 is W1.

The module 160 is parallel connected to the lamps arranged in parallel. The module 160 includes a first module 140 and a second module 150. The first module 140 is parallel connected to the first electrodes 120 of the lamps arranged in parallel, and the second module 150 is parallel connected to the second electrodes 130 of the lamps.

The lamp driving apparatus 300 supplies the power voltage to the lamps 100 through the module 160 so as to turn on or turn off the lamps 100.

Hereinafter, the lamp driving apparatus 300 is explained in detail.

Referring to FIGS. 1 and 2, the lamp driving apparatus 300 includes a substrate 310, a lamp driving module 320, sensors 330 and a voltage cut-off module 340.

Figure 3:
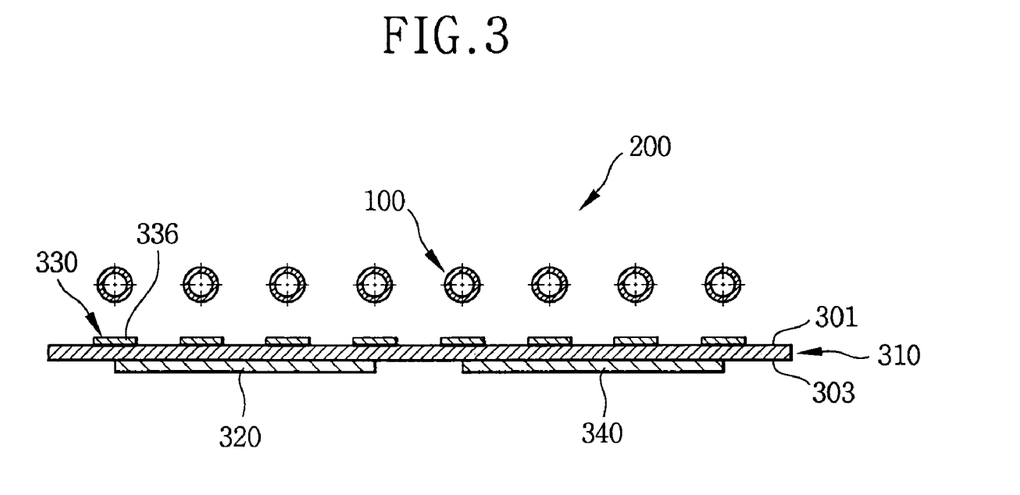
FIG. 3 is cross-sectional view taken along the line A—A of FIG. 2.

FIG. 3 is cross-sectional view taken along the line A—A of FIG. 2.

Referring to FIGS. 2 and 3, the substrate 310, for example, may be a printed circuit board. The substrate 310 has a shape of rectangular parallelepiped plate that has a first face 301 and a second face 303, and disposed under the lamps 100 to face the lamps 100. A length L2 of the substrate 310 is larger than the W1. The first face 301 of the substrate 310 faces the lamp assembly 200, and the second face 303 of the substrate 310 faces the first face 301.

For example, the substrate 310 may be disposed between the first electrode 120 and the second electrode 130. The substrate 310 may be disposed adjacent to the first electrode 120 or adjacent to the second electrode 130.

Referring again to FIGS. 1, 2 and 3, the lamp driving module 320 is mounted on the substrate 310. The lamp driving module 320 outputs the power voltage to the module 160. The lamp driving module 320 raises the voltage level from a first voltage, which is ranged from a few volts to a few hundred volts, to a second voltage that is ranged from a few kV to tens of kV. The lamp driving module 320 generates the power voltage, but also controls the frequency of the power voltage signal. In addition, the lamp driving module 320 the point of time when the power voltage signal is applied to the lamps 100. The lamp driving module 320 may be disposed on a second face 303 of the substrate 310.

The sensors 330 are mounted on a first face 301 of the substrate 310. For example, each of the sensors 330 is disposed under each of the lamps 100 such that each of the sensors 330 respectively corresponds to each of the lamps 100.

Each of the sensors 330 may be a conductive member 336. For example, the conductive member 336 comprises a metal such as copper. A magnetic field generated from the lamps 100 induces a current on the conductive member 336 according to an electromagnetic induction phenomenon. Accordingly, the conductive member 336 detects the operation state of the lamps 100 and outputs the induced current as a sensing signal 332.

The sensing signal 332 may be changed according to the operation state of the lamps 100. For example, the sensor disposed under the lamp operating normally outputs a sensing signal having maximum amplitude. The sensor disposed under the lamp operating abnormally outputs a sensing signal having minimum amplitude. The amplitude of the sensing signal may be decreases according as the degree of the abnormality of the lamps increases.

Figure 4:
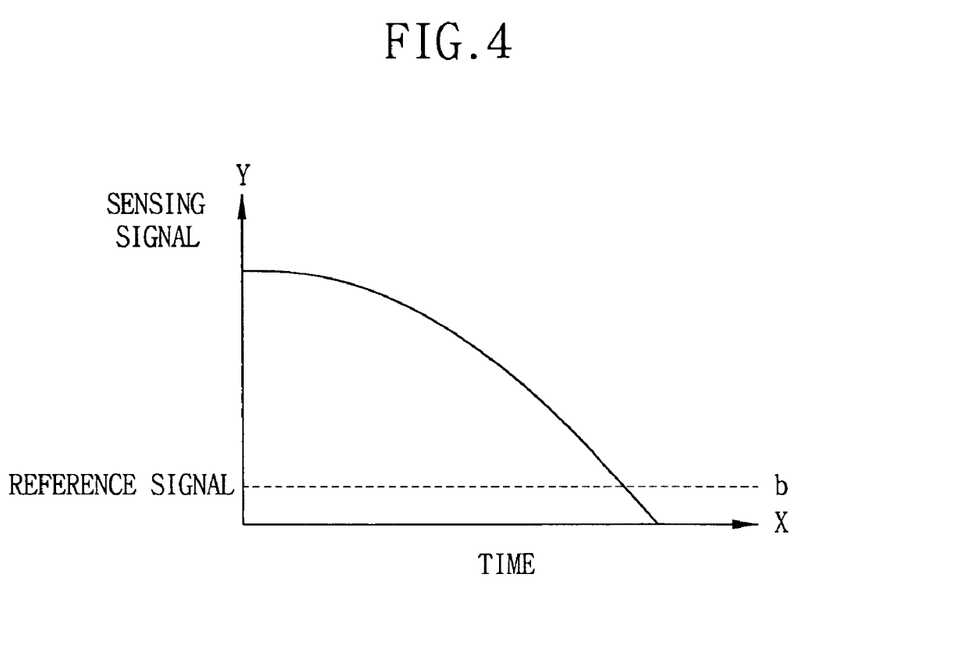
FIG. 4 is a graph showing a sensing signal outputted from a conductive member of the lamp driving apparatus of FIG. 1.

FIG. 4 is a graph showing a sensing signal outputted from a conductive member of the lamp driving apparatus of FIG. 1.

Referring to FIGS. 1 and 4, x axis represents time axis, y axis represents a signal level of the sensing signal 332. The signal level of the sensing signal 332 has a maximum value at initial point of the graph since a lamp operates normally at initial point. The lamp may operate abnormally after the lamp is used for a long time. The operation characteristic of the lamp may be deteriorated according as the operation hours of the lamp becomes longer, so that the signal level of the sensing signal 332 decreases.

A graph 'b' represents a reference signal level. The reference signal level has a constant value regardless of time. When the signal level of the sensing signal 332 is larger than the reference signal level, it is estimated that the lamp operates normally. When the signal level of the sensing signal 332 is smaller than the reference signal level, it is estimated that the lamp operates abnormally.

The farther is from the lamp, the less is the intensity of the magnetic field. Accordingly, when the distance between the lamp and the conductive member 336 is too far, the signal level of the sensing signal outputted from the conductive member 336 may be smaller than the reference signal level even though the lamp disposed over the conductive member 336 operates normally. In addition, when the distance between the lamp and the conductive member 336 is too close, the signal level of the sensing signal outputted from the conductive member 336 may be larger than the reference signal level.

Therefore, for example the distance between the conductive member 336 and the lamp disposed over the conductive member 336 may be in a range from about 3 mm to about 5 mm.

Figure 5:
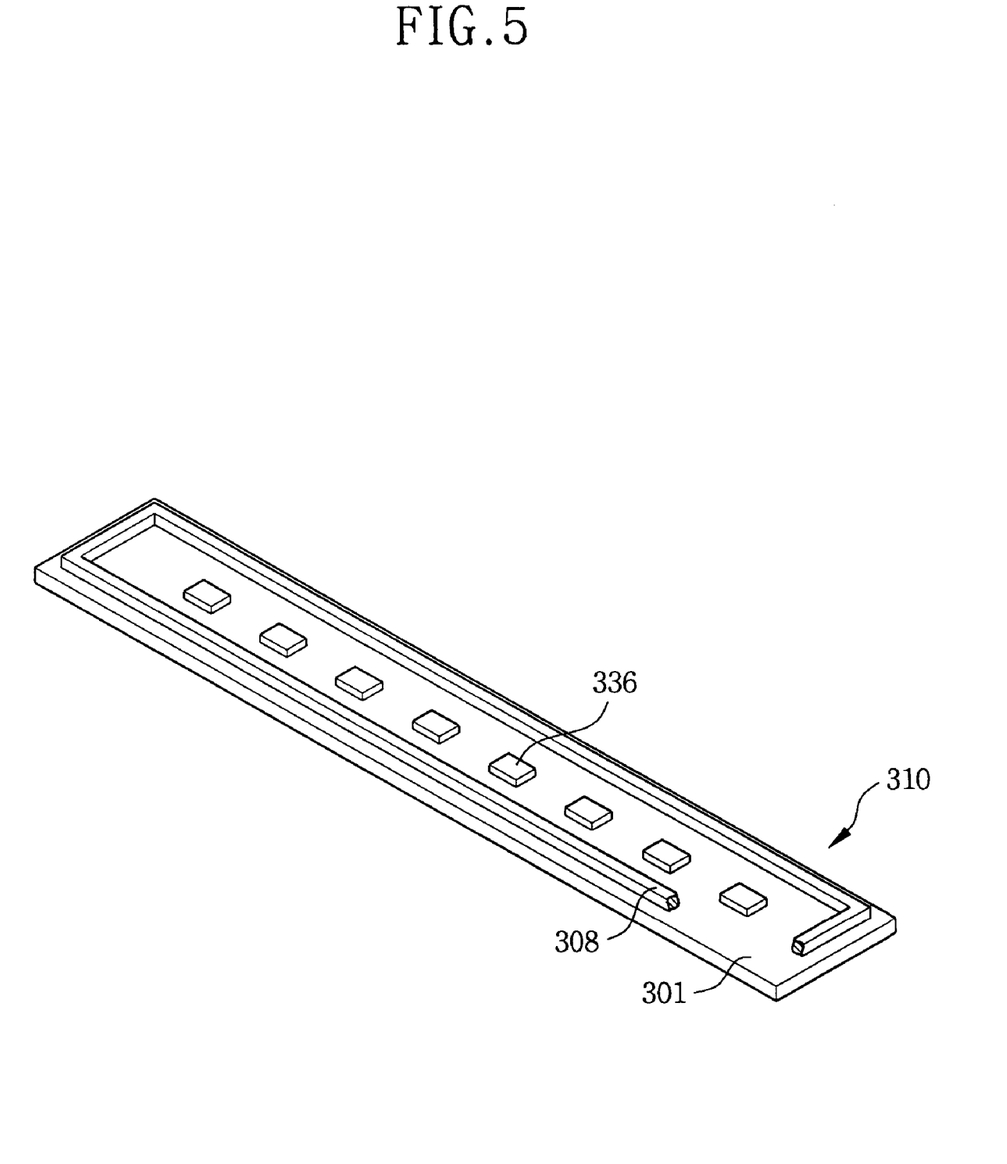
FIG. 5 is a perspective view showing a distance regulation member for regulating a distance between the lamps and the conductive member of FIG. 1.

FIG. 5 is a perspective view showing a distance regulation member for regulating a distance between the lamps and the conductive member of FIG. 1.

Referring to FIG. 5, a distance regulation member 308 is mounted on the first face 301 of the substrate on which the conductive member 336 is formed along the circumference of the substrate 310. The distance regulation member 308 regulates the distance between the lamp and the conductive member 336.

The distance regulation member 308 has a shape of a rectangular frame. The distance regulation member 308 may have a pillar (or post) shape to be disposed on the first face 301 of the substrate 310. The distance between the lamp and the conductive member 336 may be regulated to be in the range from about 3 mm to about 5 mm. The distance regulation member 308 comprises an insulation material so as to prevent the conductive member 336 of the substrate 310 from being electrically short with other conductive material.

Referring again to FIG. 1, the voltage cut-off module 340 is disposed on the substrate 310. The voltage cut-off module 340 receives the sensing signal 332 outputted from the sensors 330. The voltage cut-off module 340 compares the reference signal level and the signal level of the sensing signal 332, and a voltage supply signal 342 and a voltage cut-off signal 344 depending on the result of the comparison.

Particularly, the voltage cut-off module 340 receives the sensing signals 332 outputted from all of the sensors 330. The voltage cut-off module 340 compares the reference signal level and the signal level of the sensing signal 332, and provides the lamp driving module 320 with the voltage supply signal 342 so that the lamp driving module 320 applies the power voltage to the lamps 100 when all of the signal levels are larger than the reference signal levels. Accordingly, all of the lamps 100 are turned on by the power voltage applied from the lamp driving module 320.

The voltage cut-off module 340 provides the lamp driving module 320 with the voltage cut-off signal 344 so that the lamp driving module 320 does not apply the power voltage to the lamps 100 when at least one signal levels of the sensing signals 332 are smaller than the reference signal levels. Accordingly, all of the lamps 100 are turned off by the lamp driving module 320 in order to prevent overcurrent from flowing into the lamps that operates normally.

The voltage cut-off module 340 is connected to the lamp driving module 320 and the alarm 345 mounted on the substrate 310. The alarm 345 starts an alarm operation in response to the voltage cut-off signal 344 when at least one lamp operates abnormally. The alarm 345 may alarm with a voice or a sound.

According to above embodiment, the lamp driving module applies power voltage to the lamps arranged in parallel to turn on or turn off the lamps, and each of the sensors detects the operation state of the corresponding lamp. The voltage cut-off module compares the reference signal level and the signal level of the sensing signals outputted from the sensors, prevents the lamp driving module from applying the power voltage to the lamps when at least one signal levels of the sensing signals are smaller than the reference signal levels, so that the lamps operating normally may be protected from the overcurrent flowing threreinto.

<Embodiment 2 of Lamp Driving Apparatus>

Figure 6:
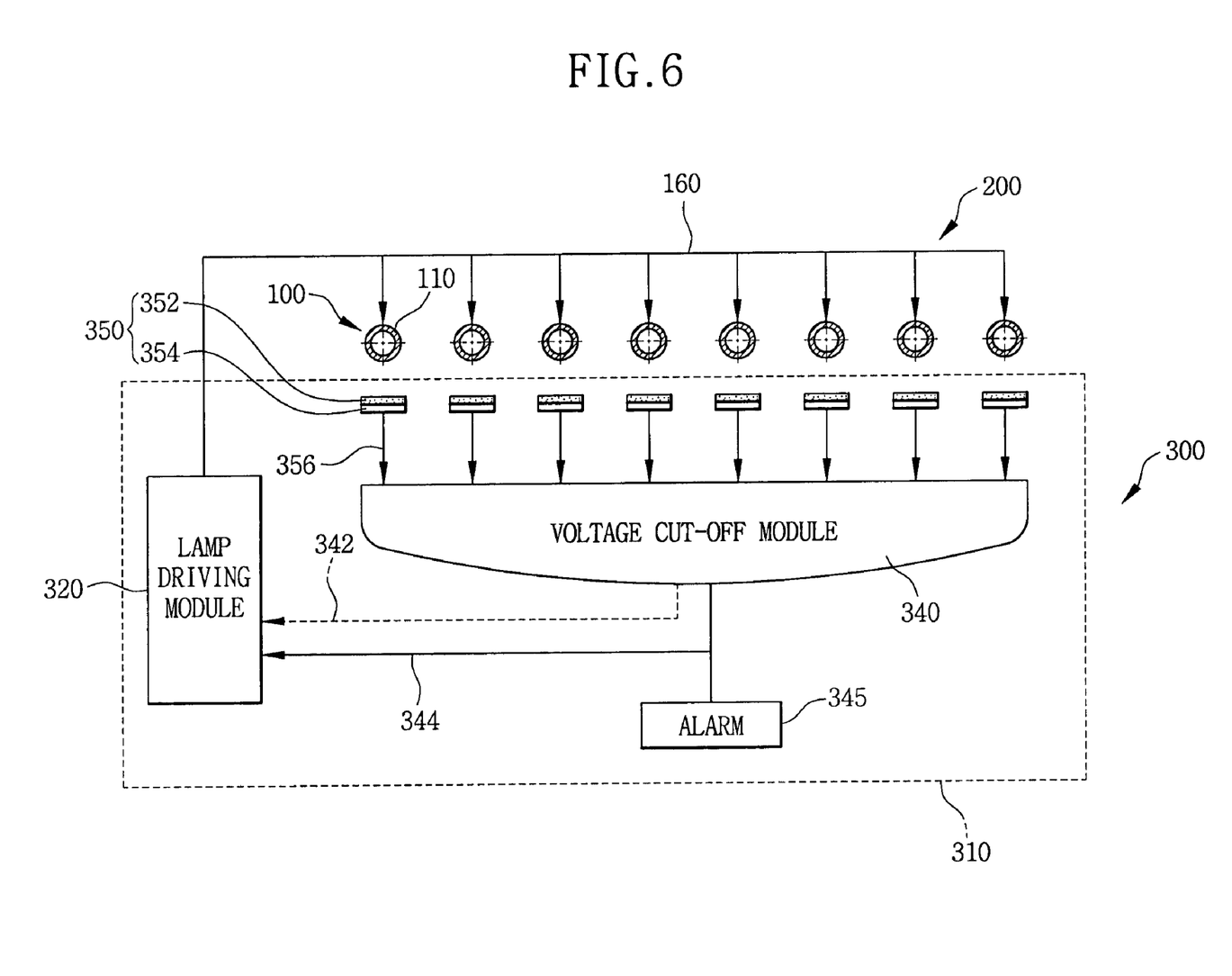
FIG. 6 is a schematic view showing a lamp driving apparatus according to a second exemplary embodiment of the present invention.

FIG. 6 is a schematic view showing a lamp driving apparatus according to a second exemplary embodiment of the present invention. In the embodiment 2 of lamp driving apparatus, other elements except the sensors are the same as those of the embodiment 1, the same reference numerals denote the same elements of embodiment 1, and thus the detailed descriptions of the same elements will be omitted.

Referring to FIG. 6, the sensors 350 are mounted on a first face 301 of the substrate 310. For example, each of the sensors 350 is disposed under each of the lamps 100 such that each of the sensors 350 respectively corresponds to each of the lamps 100.

The sensors 350 generate sensing signals 356 in accordance with the operation state of the lamps 100. The sensing signals 356 may be changed according to the operation state of the lamps 100. For example, the sensor disposed under the lamp operating normally outputs a sensing signal having maximum amplitude. The sensor disposed under the lamp operating abnormally outputs a sensing signal having minimum amplitude. The amplitude of the sensing signal may decrease according as the degree of the abnormality of the lamps increases.

Each of the sensors 330 is a photoelectric sensor for transducing the light generated from the lamps to a current signal according to a photoelectric effect phenomenon to output the sensing signal. For example, the sensors 350 may include a conductive member 354 and an amorphous silicon thin film 352. For example, the conductive member 354 comprises a metal, and the amorphous silicon thin film 352 is deposited on an upper surface of the conductive member 354 by a chemical vapor deposition (CVD). The sensors 350 having the amorphous silicon thin film 352 deposited on the conductive member 354 is disposed on the first face 301 of the substrate 310 such that each of the sensors 350 respectively corresponds to each of the lamps 100.

A portion of the conductive member 354 is electrically connected to the voltage cut-off module 340 so as to output the sensing signal 356.

The sensor 350 generates the sensing signal 356 in response to quantity of the light perpendicularly incident into the sensor 350.

When the distance between the lamp 100 and the sensor 350 is very close and the quantity of the light incident into the sensor is very large, the sensor disposed under the lamp operating abnormally may receive the light generated from the lamp operating normally. In addition, when the distance between the lamps is very close and the quantity of the light incident into the sensor is very large, the sensor disposed under the lamp operating abnormally may receive the light generated from the lamp operating normally.

In this case, the signal level of the sensing signal generated from the sensor disposed under the lamp operating abnormally is similar to that of the sensing signal generated from the sensor disposed under the lamp operating normally.

Figure 7:
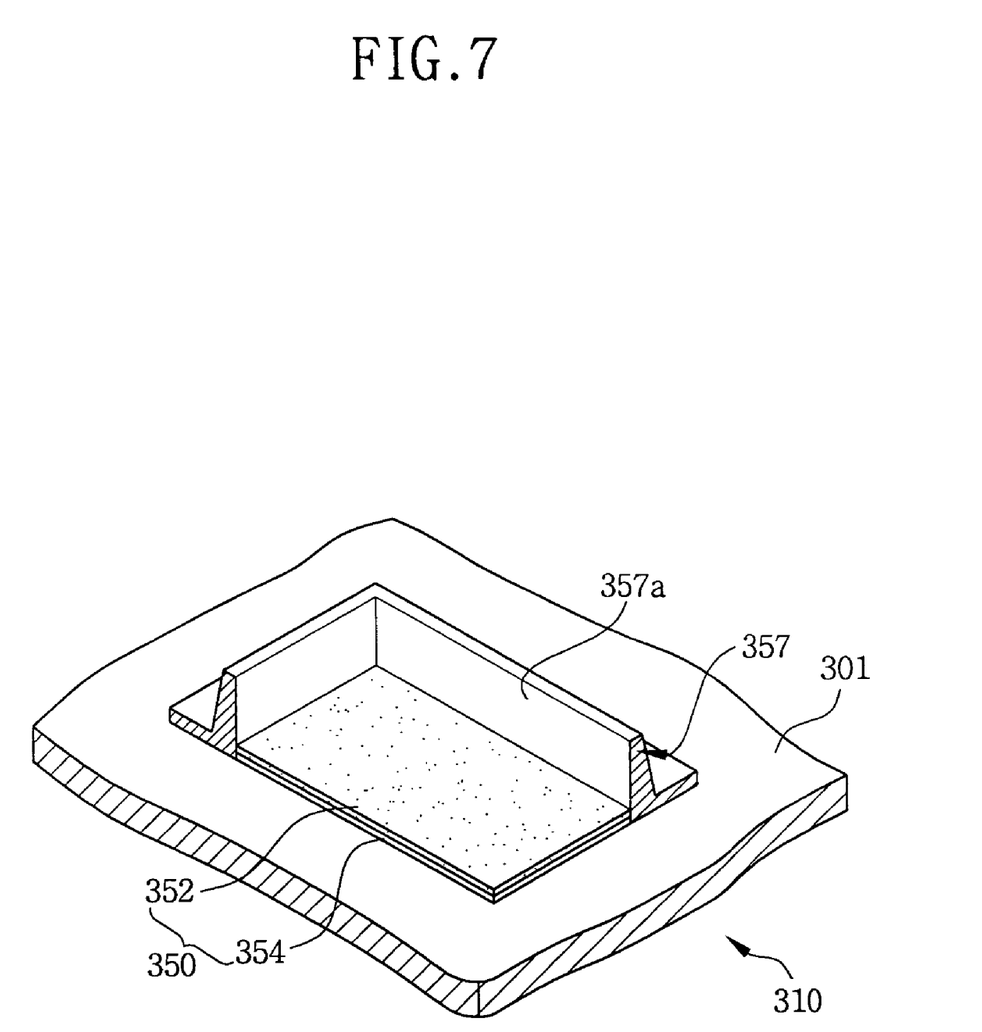
FIG. 7 is partial perspective view showing a light interference protection member of the lamp driving apparatus of FIG. 6.

FIG. 7 is partial perspective view showing a light interference protection member of the lamp driving apparatus of FIG. 6.

Referring to FIG. 7, the light interference protection member 357 is disposed at the circumference of the sensor 350. The sensor 350 is surrounded with the light interference protection member 357. The light interference protection member 357 includes a plurality of sidewalls 357a surrounding the circumference of the sensor 350. The light interference protection member 357 has an opening though which the light generated from the lamp is incident into the sensor 350. The light interference protection member 357 prevents the sensor from being affected by the lamps adjacent to the lamp disposed over the sensor.

The sensing signals 356 generated from the sensors 350 are applied to the voltage cut-off module 340. The voltage cut-off module 340 compares the reference signal level and the signal level of the sensing signal 356. The voltage cut-off module 340 provides the lamp driving module 320 with the voltage supply signal 342 so that the lamp driving module 320 applies the power voltage to the lamps 100 when all of the signal levels are larger than the reference signal levels. Accordingly, all of the lamps 100 are turned on by the power voltage applied from the lamp driving module 320.

The voltage cut-off module 340 provides the lamp driving module 320 with the voltage cut-off signal 344 so that the lamp driving module 320 does not apply the power voltage to the lamps 100 when at least one signal levels of the sensing signals 356 are smaller than the reference signal levels. Accordingly, when the voltage cut-off signal 344 is applied to the lamp driving module 320, all of the lamps 100 are turned off by the lamp driving module 320.

According to the embodiment 2, the operation state of a lamp is detected by a sensor using the quantity of the light generated from the lamp disposed over the sensor when the distance between the lamp and the sensor is too far or too close for the sensor to exactly detect the operation state of the lamp.

<Embodiment 3 of Lamp Driving Apparatus>

Figure 8:
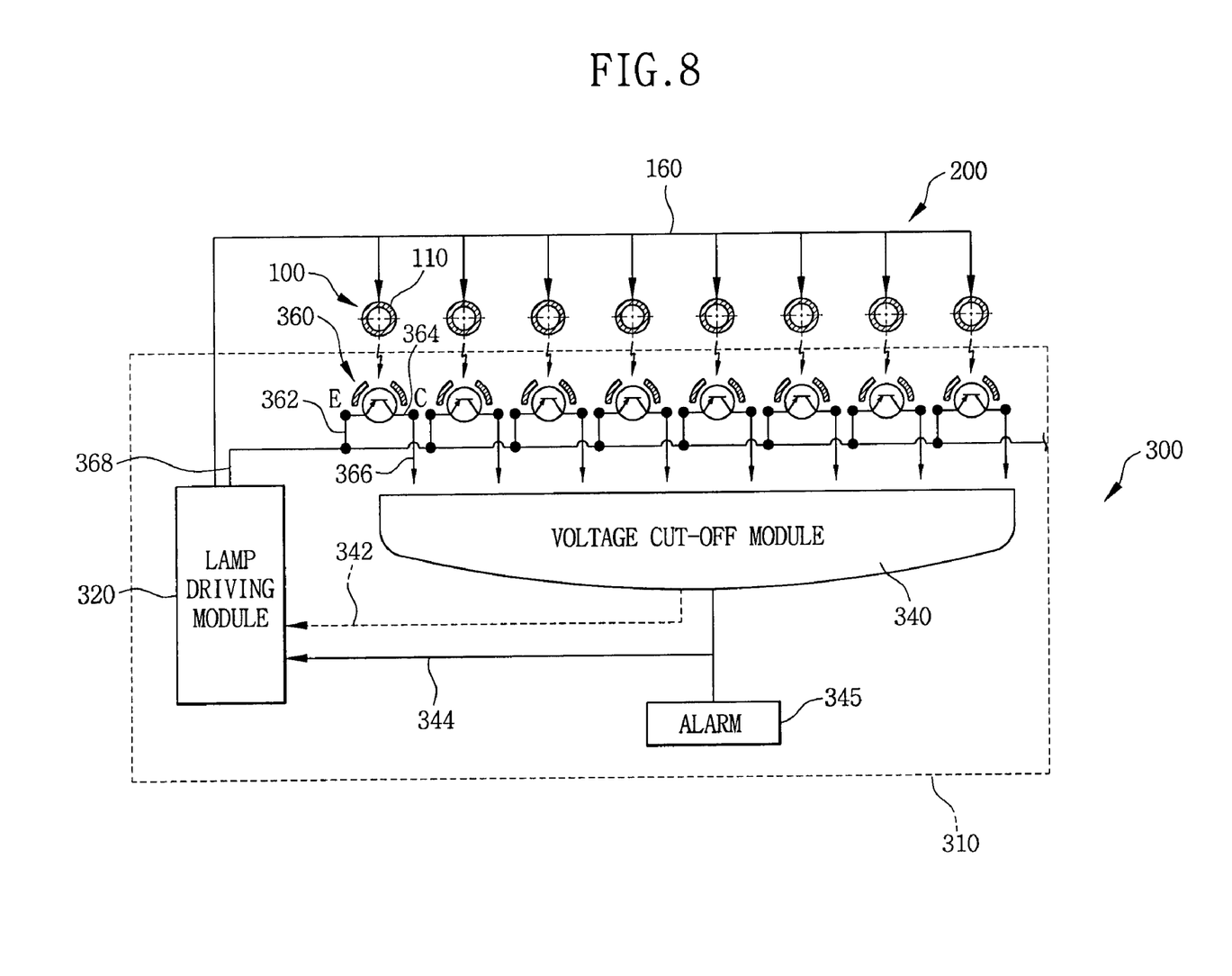
FIG. 8 is a schematic view showing a lamp driving apparatus according to a third exemplary embodiment of the present invention.

FIG. 8 is a schematic view showing a lamp driving apparatus according to a third exemplary embodiment of the present invention. In the embodiment 3 of the lamp driving apparatus, other elements except the sensors are the same as those of the embodiment 2, the same reference numerals denote the same elements of embodiment 2, and thus the detailed descriptions of the same elements will be omitted.

Referring to FIG. 8, the sensors 360 generate sensing signals 366 in accordance with the quantity of the light generated from the lamps 100. The sensing signals 356 may be changed according to the operation state of the lamps 100.

Each of the sensors 360 includes a photoelectric device for transducing the light generated from the lamps to a current signal by a photovoltaic effect. For example, the sensor 360 includes a photodiode or a phototransistor. The photodiode or the phototransistor has a thin film shape.

The sensors 360 are mounted on a first face 301 of the substrate 310. For example, each of the sensors 360 is disposed under each of the lamps 100 such that each of the sensors 360 respectively corresponds to each of the lamps 100.

A power voltage Vcc is applied to a first electrode 362 of the sensor 360, and a second electrode 364 of the sensor 360 is connected to the voltage cut-off module 340. The power voltage Vcc is applied to the first electrode 362 of the sensor 360 through a signal line 368 by the lamp driving module 320. When the sensor 360 is a phototransistor, for example, the first electrode 362 may be an emitter electrode of the phototransistor, and the second electrode 364 may be a collector electrode of the phototransistor. When the light of which intensity is larger than a predetermined value is applied to the base electrode of the phototransistor, the threshold voltage of the phototransistor is lowered, and current is able to flow from the emitter electrode 362 to the collector electrode 364. Accordingly, the power voltage Vcc applied to the emitter electrode 362 is also applied to the collector electrode 364. The sensing signal 366 is outputted from the collector electrode 364.

In case the sensor 360 is a photodiode, when a reverse voltage is applied to the PN junction of the photodiode and the light of which intensity is larger than a predetermined value is incident into the PN junction, the photodiode is turned on to output the sensing signal 366.

The voltage cut-off module 340 receives the sensing signal 366 outputted from the second electrode 364 and determines the operation state of the lamp. The sensor disposed under a lamp operating normally outputs a sensing signal having a high level. However, the sensor disposed under a lamp operating abnormally outputs a sensing signal having a low level or does not output a sensing signal since a small quantity of light is incident into the sensor.

When a low level sensing signal is supplied to the voltage cut-off module 340 from at least one sensor 360, the voltage cut-off module 340 provides the lamp driving module 320 with the voltage cut-off signal 344 so that the lamp driving module 320 does not apply the power voltage to the lamps 100.

When sensing signals having high level are supplied to the voltage cut-off module 340 from all of the sensors 360, the voltage cut-off module 340 provides the lamp driving module 320 with the voltage applying signal 342 so that the lamp driving module 320 applies the power voltage to the lamps 100.

According to the embodiment 3, the embodiment 3 may be adopted when the distance between the lamp and the sensor is too far or too close for the sensor to exactly detect the turn-on or turn-off state of the lamp in accordance with photoelectric effect or electromagnetic induction.

<Embodiment 1 of Backlight Assembly>

Figure 9:
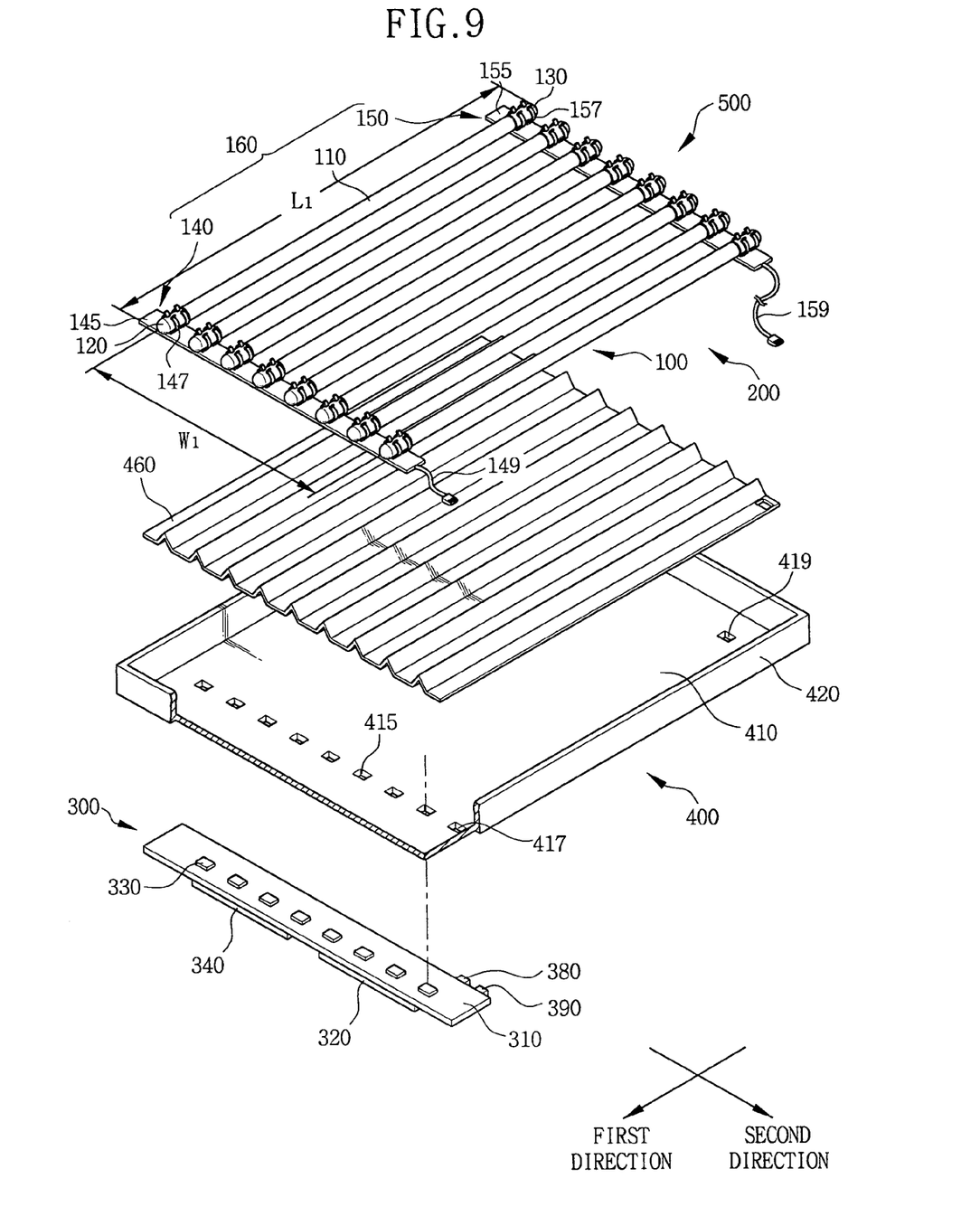
FIG. 9 is an exploded perspective view showing a first exemplary embodiment of a backlight assembly according to the present invention.

FIG. 9 is an exploded perspective view showing a first exemplary embodiment of a backlight assembly according to the present invention.

Referring to FIG. 9, the backlight assembly 500 includes a lamp assembly 200, a lamp driving apparatus 300 and a receiving container 400.

The lamp assembly 200 includes a plurality of lamps 100 and a module 60.

Each of the lamps 100 includes a lamp body 110, a first electrode 120 and a second electrode 130. The first electrode 120 is disposed at a first end of the lamp, and the second electrode 130 is disposed at a second end of the lamp. For example, the first and second electrode 120 and 130 is external electrodes disposed at the external surface of the lamp body 110.

At least two lamps are arranged in parallel. Each of the lamps has a length L1, and the total width of the lamps 100 is W1.

The module 160 is parallel connected to the lamps arranged in parallel. The module 160 includes a first module 140 and a second module 150. The first module 140 includes a first conductive plate 145 and a first clip 147. The first clip 147 fixes the first electrodes of the lamps. The second module 150 includes a second conductive plate 155 and a second clip 157. The second clip 157 fixes the second electrodes of the lamps. The first module 140 is connected to a first power line 149, and the second module 150 is connected to a second power line 159.

The receiving container 400 receives the lamp assembly 200. The receiving container 400 includes a bottom face 410 and side faces 420. The bottom face 410 and the side face 420 provide enough receiving space to receive the lamp assembly 200.

The bottom face 410 has a plurality of openings facing each of the lamps 100. Each of the openings has an enough area to pass the light or the magnetic flux generated from the lamps 100 through the openings. For example, the openings may be arranged along a straight line on the bottom face 410 of the receiving container 400.

The bottom face 410 includes a first opening 417 and a second opening 419. The first power line 149 connected to the first module 145 is drawn out through the first opening 417. The second power line 159 connected to the second module 150 is drawn out through the second opening 419.

The first power line 149 is connected to a first connection part 380, and the second power line 159 is connected to a second connection part 390. The first and second connection parts 380 and 390 are connected to the lamp driving module 320.

A lamp driving apparatus 300 is disposed an outer surface of the bottom face 410 of the receiving container 400. The lamp driving apparatus 300 turns off all of the lamps 100 when a lamp operating abnormally is detected. The lamp driving apparatus 300 is insulated from the receiving container 400. Especially, when the receiving container 400 comprises a conducting material, the lamp driving apparatus 300 should be completely insulated from the receiving container 400. Therefore, a conductive member may be formed along the circumference of the substrate 310, the conductive member insulate the sensors 330 and the receiving container 400.

The lamp driving apparatus 300 includes a substrate 310, sensors 330, a lamp driving module 320 and a voltage cut-off module 340.

Each of the sensors 330 is disposed on the substrate 310 to be disposed under each of the lamps 100. The lamp driving module 320 supplies power voltage to the module 160 of the lamp assembly 200. The voltage cut-off module 340 compares a reference signal level and the signal level of the sensing signal outputted from the sensors 330, and provides the lamp driving module 320 with the voltage supply signal or voltage cut-off signal so that the lamp driving module 320 applies or does not applies the power voltage to the lamps 100.

For example, the sensor includes a conductive member for transducing a magnetic flux generated from at least one of the lamps to a current signal.

Since the lamp driving apparatus 300 of this embodiment is the same as that of the embodiment 1 of the lamp driving apparatus, the same reference numerals denote the same elements of the embodiment 1 of the lamp driving apparatus, and thus the detailed descriptions of the same elements will be omitted.

A reflection plate 460 may be further installed on the bottom face 410 of the receiving container 400. The reflection plate 460 reflects the light generated from the lamps 100.

<Embodiment 2 of Backlight Assembly>

Figure 10:
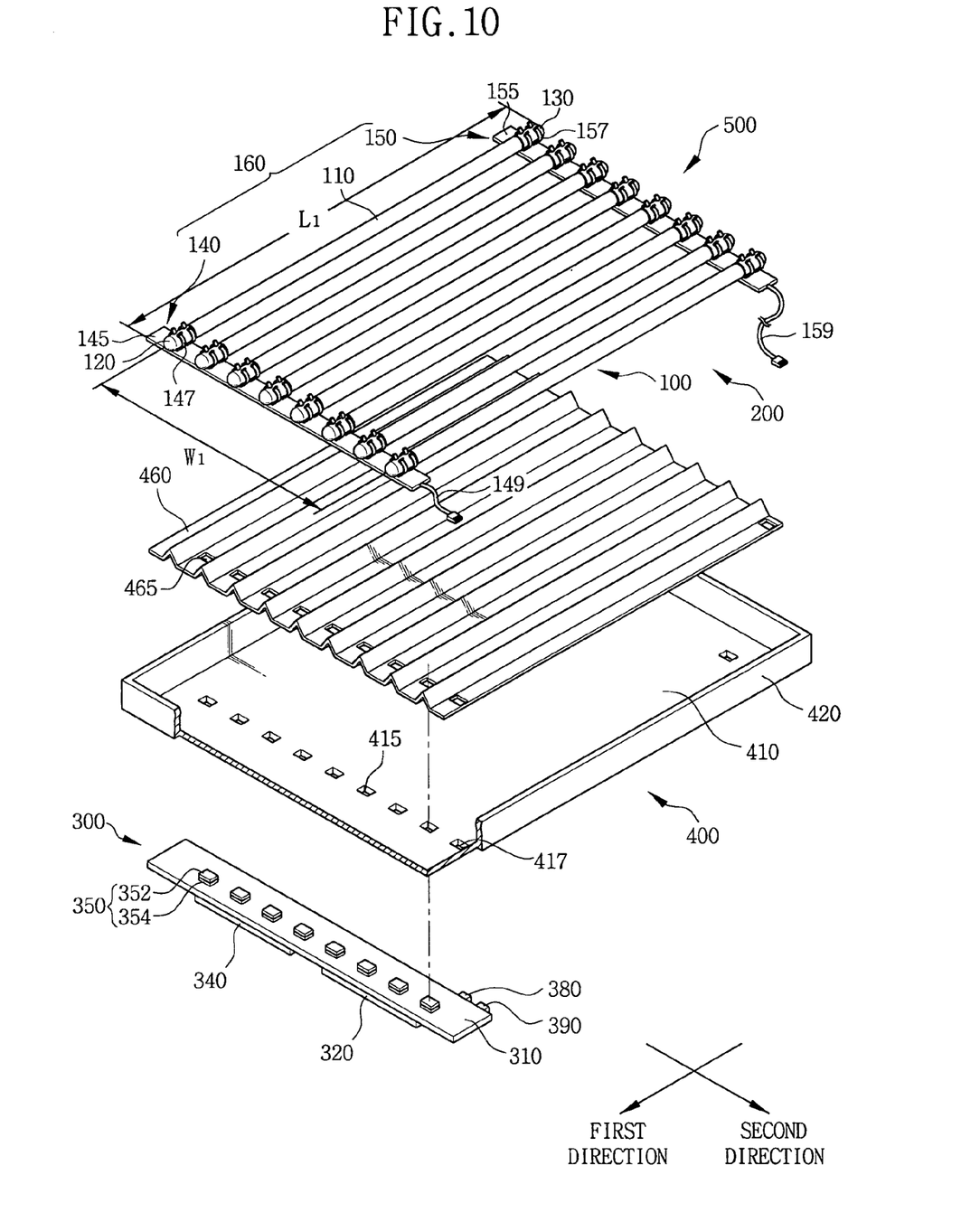
FIG. 10 is an exploded perspective view showing a second exemplary embodiment of a backlight assembly according to the present invention.

FIG. 10 is an exploded perspective view showing a second exemplary embodiment of a backlight assembly according to the present invention. In the embodiment 2 of the backlight assembly, other elements except the reflection plate and sensors are the same as those of the embodiment 1 of the backlight assembly, the same reference numerals denote the same elements of embodiment 1 of the backlight assembly, and thus the detailed descriptions of the same elements will be omitted.

Referring to FIG. 10, the sensors 350 includes a conductive member 450 and an amorphous silicon thin film 352. The amorphous silicon thin film 352 is disposed on an upper surface of the conductive member 354. The amorphous silicon thin film 354 transduces the light generated from the lamps 100 to current by a photoelectric effect.

The reflection plate 460 includes openings 465. The openings 460 formed on the reflection plate 460 allow the light generated from the lamps 100 to be incident into the sensors 350. Each of the openings 465 is disposed under each of the openings 415 formed on the bottom face 410 of the receiving container 400.

<Embodiment 3 of Backlight Assembly>

Figure 11:
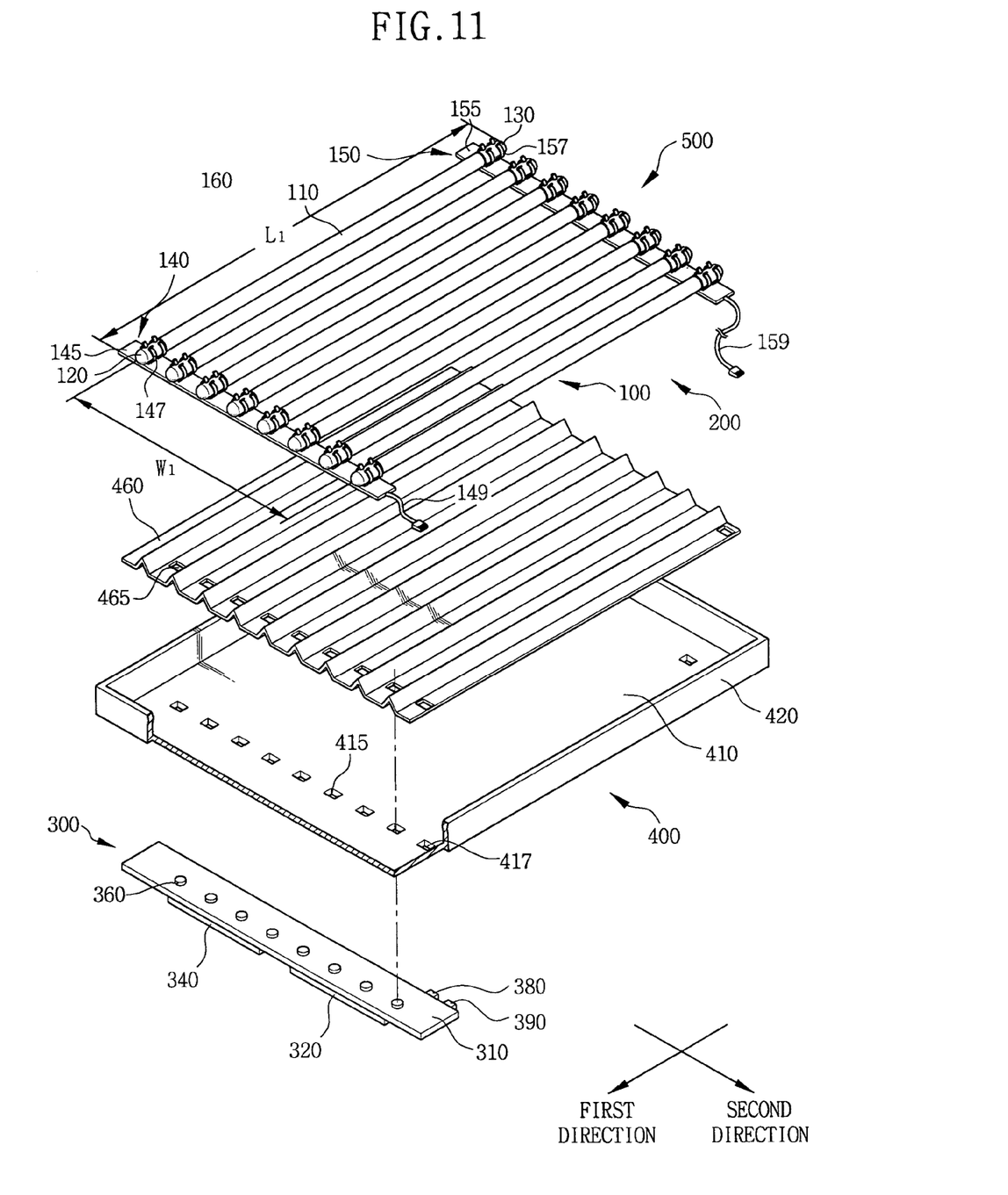
FIG. 11 is an exploded perspective view showing a third exemplary embodiment of a backlight assembly according to the present invention.

FIG. 11 is an exploded perspective view showing a third exemplary embodiment of a backlight assembly according to the present invention. In the embodiment 3 of the backlight assembly, other elements except the reflection plate and sensors are the same as those of the embodiment 1 of the backlight assembly, the same reference numerals denote the same elements of embodiment 1 of the backlight assembly, and thus the detailed descriptions of the same elements will be omitted.

Referring to FIG. 11, the sensors 360 includes a photoelectric device for transducing the light generated from the lamps to current by a photovoltaic effect. For example, the sensor 360 includes a photodiode or a phototransistor.

The reflection plate 460 includes openings 465. The openings 460 formed on the reflection plate 460 allow the light generated from the lamps 100 to be incident into the sensors 360. Each of the openings 465 is disposed under each of the openings 415 formed on the bottom face 410 of the receiving container 400.

<Embodiment of liquid crystal display device>

Figure 12:
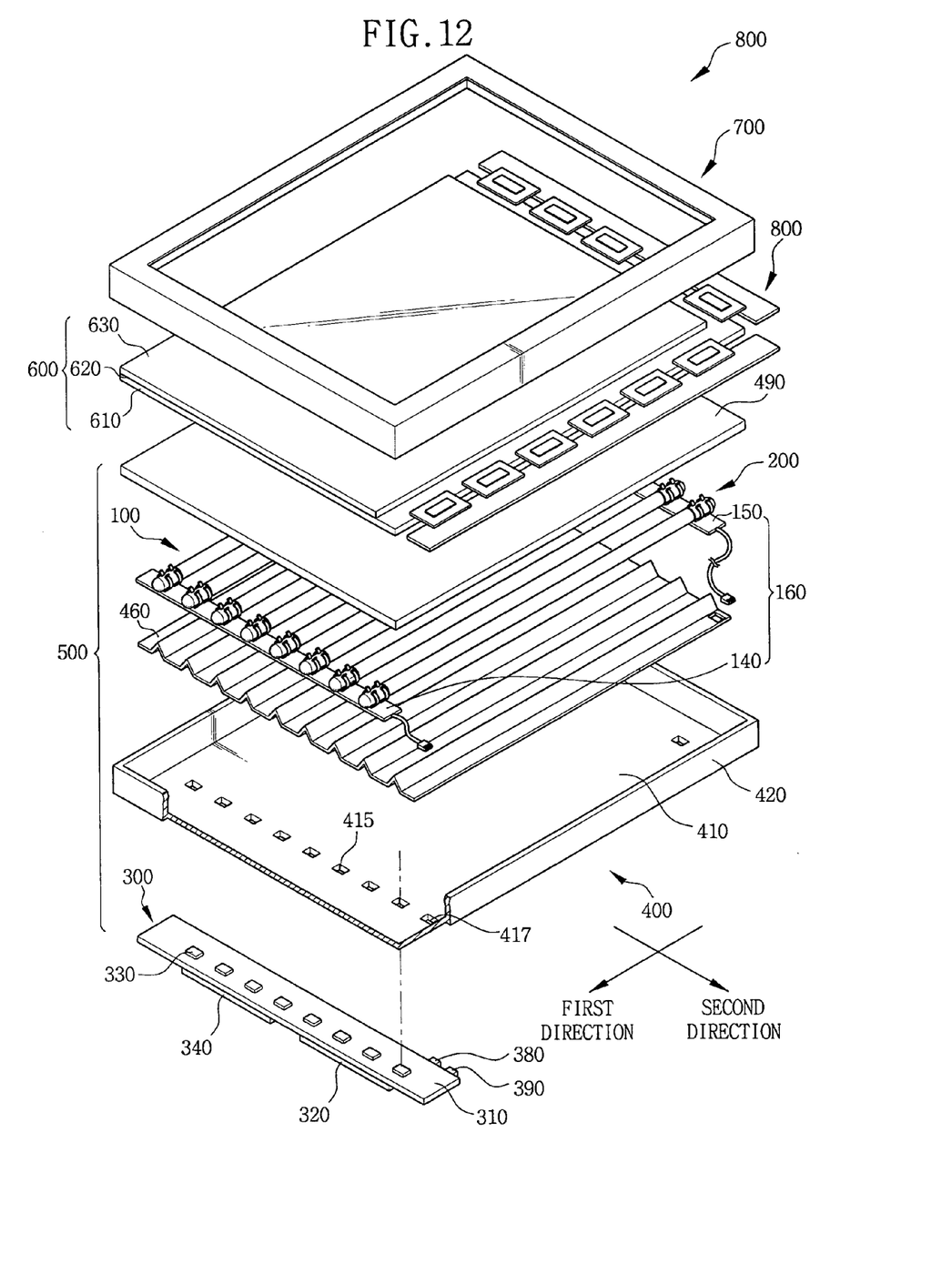
FIG. 12 is an exploded perspective view showing an example of a liquid crystal display device according to the present invention.

FIG. 12 is an exploded perspective view showing an example of a liquid crystal display device according to the present invention.

Referring to FIG. 12, the liquid crystal display device 800 includes a backlight assembly 500 and a liquid crystal display panel 600. The liquid crystal display device 800 may further includes a chassis 700.

The backlight assembly 500 includes a lamp assembly 200, a lamp driving apparatus 300, a receiving container 400 and optical plate(s) 490.

The lamp assembly 200 includes lamps 100 and a module 160. The lamp assembly 200 described in the embodiments of the lamp driving apparatus will not be further described below to avoid a redundancy.

The receiving container 400 receives the lamp assembly 200. The receiving container 400 includes a bottom face 410 having a plurality of openings 415 each of which faces each of the lamps 100. Each of the openings has an enough area to pass the light or the magnetic flux generated from the lamps 100 through the openings 415.

A lamp driving apparatus 300 is disposed an outer surface of the bottom face 410 of the receiving container 400.

The lamp driving apparatus 300 includes a substrate 310, sensors 330, a lamp driving module 320 and a voltage cut-off module 340.

Each of the sensors 330 is disposed on the substrate 310 to be disposed under each of the lamps 100. For example, the sensor includes a conductive member for transducing a magnetic flux generated from at least one of the lamps to a current signal. The sensor may include a photoelectric sensor for transducing a light generated from at least one of the lamps to a current signal by a photoelectric effect. The sensor may include a photoelectric device for transducing a light generated from at least one of the lamps to a current signal by a photovoltaic effect.

The lamp driving apparatus 300 includes a voltage cut-off module 340. The voltage cut-off module 340 provides the lamp driving module 320 with the voltage supply signal when all of the signal levels of sensing signals outputted from the sensors are larger than the reference signal levels. Accordingly, all of the lamps 100 are turned on by the power voltage applied from the lamp driving module 320.

The voltage cut-off module 340 provides the lamp driving module 320 with the voltage cut-off signal when at least one signal levels of the sensing signals are smaller than the reference signal levels. Accordingly, all of the lamps 100 are turned off by the lamp driving module 320.

A reflection plate 460 may be further installed between the bottom face 410 of the receiving container 400 and the lamp assembly 200. The reflection plate 460 reflects the light generated from the lamps 100 toward the liquid crystal display panel 600 so as to enhance display quality.

The liquid crystal display panel 600 is received in the receiving container 400. The liquid crystal display panel 600 displays an image using the light generating from the lamp assembly 200.

The liquid crystal display panel 600 includes a thin film transistor (TFT) substrate 610, a liquid crystal layer 620 and a color filter substrate 630.

The TFT substrate 610 includes a plurality of thin film transistors and pixel electrodes. The thin film transistors are arranged in a matrix shape on a first transparent substrate.

The color filter substrate 630 faces the TFT substrate 610, and includes a common electrode and color filters formed on a second transparent substrate. The common electrode is formed on an entire surface of the second transparent substrate on which the color filters are formed, and faces the pixel electrode. The color filter are disposed between the common electrode and the second transparent substrate, and disposed over each of the pixel electrodes.

The liquid crystal is disposed between the TFT substrate 610 and the color filter substrate 630. An electric field is formed between the pixel electrode and the common electrode and the amount of the light passing through the liquid crystal layer is regulated. The light generated from the lamp assembly 200 passes through the liquid crystal layer and an image is displayed.

While the exemplary embodiments of the present invention and its advantages have been described in detail, it should be understood that various changes, substitutions and alterations can be made herein without departing from the scope of the invention as defined by appended claims.

What is claimed is:

1. A liquid crystal display device comprising:
a backlight assembly including i) a lamp assembly including a plurality of lamps arranged in parallel, each of the lamps having a first electrode formed at a first end and a second electrode formed at a second end, the lamp assembly providing the lamps with a power voltage to turn on or turn off the lamps, ii) a receiving container to receive the lamp assembly, the receiving container having a plurality of openings facing each of the lamps, iii) a lamp driving device including iii-1) a substrate facing the receiving container, iii-2) a lamp driving module, mounted on the substrate, to provide the lamps with the power voltage, iii-3) a plurality of sensors, disposed on the substrate to face the lamps, to detect an operation state of the lamps and to output a plurality of sensing signals, iii-4) a voltage cut-off module, disposed on the substrate, to compare the sensing signals with a predetermined reference signal, the voltage cut-off module providing the lamp driving module with a voltage cut-off signal to prevent the lamp driving module from providing the lamps with the power voltage when at least one of the sensing signals has an amplitude smaller than the reference signal; and
a liquid crystal display panel assembly, mounted on the receiving container, to display an image using a light generating from the lamps.

2. A backlight assembly comprising:
a lamp assembly including a plurality of lamps arranged in parallel, each of the lamps having a first electrode formed at a first end and a second electrode formed at a second end, the lamp assembly providing the lamps with a power voltage to turn on or turn off the lamps;
a receiving container that receives the lamp assembly, the receiving container having a plurality of openings facing each of the lamps;
a lamp driving device including i) a substrate facing the receiving container, ii) a lamp driving module, mounted on the substrate, to provide the lamps with the power voltage, iii) a plurality of sensors, disposed on the substrate to face the lamps, to detect an operation state of the lamps to output a plurality of sensing signals, iv) a voltage cut-off module, disposed on the substrate, to compare the sensing signals with a predetermined reference signal, the voltage cut-off module providing the lamp driving module with a voltage cut-off signal to prevent the lamp driving module from providing the lamps with the power voltage when at least one of the sensing signals has an amplitude smaller than the reference signal.

3. The backlight assembly of claim 2, wherein the lamp assembly further comprises a first module and a second module through which the power voltage is supplied to the lamps, the first electrodes of each of the lamps are connected to the first module, the second electrodes of each of the lamps are connected to the second module, and the first and second module are connected to the lamp driving module.

4. The backlight assembly of claim 2, wherein the sensors includes a conductive member that transduces a magnetic flux generated from at least one of the lamps to a current signal to output the sensing signal.

5. The backlight assembly of claim 2, further comprising a reflection plate, disposed between the lamps and the receiving container, to reflect a light incident into the receiving container toward the lamps.

6. The backlight assembly of claim 2, wherein the sensors are electrically insulated by an insulation member.

7. The backlight assembly of claim 6, wherein the insulation member is disposed on the substrate and insulates the sensors from the receiving container.

8. The backlight assembly of claim 2, wherein each of the sensors are disposed under each of the openings.

9. The backlight assembly of claim 2, wherein the sensors are disposed on a first surface of the receiving container, and the lamp driving module and the voltage cut-off module are disposed on a second surface of the receiving container, the first surface facing the lamps, the second surface facing the first surface.

10. A lamp driving apparatus comprising:
a plurality of lamps arranged in parallel;
a substrate facing the lamps;
a lamp driving module, mounted on the substrate, to provide the lamps with a power voltage;
a plurality of sensors, disposed on the substrate to face the lamps, to detect an operation state of the lamps and to output a plurality of sensing signals; and
a voltage cut-off module, disposed on the substrate, to compare the sensing signals with a predetermined reference signal, the voltage cut-off module providing the lamp driving module with a voltage cut-off signal to prevent the lamp driving module from providing the lamps with the power voltage when at least one of the sensing signals has an amplitude smaller than the reference signal.

11. The lamp driving apparatus of claim 10, wherein the sensors includes a conductive member that transduces a magnetic flux generated from at least one of the lamps to a current signal to output the sensing signal.

12. The lamp driving apparatus of claim 11, wherein the conductive member comprises a copper plate.

13. The lamp driving apparatus of claim 10, wherein each of the sensors is spaced apart from each of the lamps by a distance in a range from about 3 mm to about 5 mm.

14. The lamp driving apparatus of claim 13, wherein the substrate further includes a distance regulation member to regulate the distance between the sensors and the lamps.

15. The lamp driving apparatus of claim 10, wherein the sensing signal is a first current signal and the reference signal is a second current signal.

16. The lamp driving apparatus of claim 10, wherein the substrate further includes an alarming device that alarms in response to the voltage cut-off signal.

17. The lamp driving apparatus of claim 10, wherein the sensor includes a photoelectric sensor that transduces a light generated from at least one of the lamps to a current signal based on a photoelectric effect to output the sensing signal.

18. The lamp driving apparatus of claim 17, wherein the photoelectric sensor includes a conductive member and an amorphous silicon thin film, the amorphous silicon thin film formed on the conductive member to face the lamps.

19. The lamp driving apparatus of claim 17, wherein the sensor further includes a light interference protection member that selectively receives the light generated from the lamps.

20. The lamp driving apparatus of claim 10, wherein the sensor includes a photoelectric device that transduces a light generated from at least one of the lamps to a current signal based on a photovoltaic effect to output the sensing signal.

21. The lamp driving apparatus of claim 17, wherein the photoelectric device includes a photodiode or a phototransistor, the photodiode or the phototransistor having a thin film shape.

22. The lamp driving apparatus of claim 20, wherein the sensor further includes a light interference protection member that selectively receives the light generated from the lamps.

* * * * *